United States Patent
Hua (10) Patent No.: US 10,488,271 B2
(45) Date of Patent: Nov. 26, 2019

(54) HEAT RADIATION-RESISTANT NTC TEMPERATURE SENSORS AND APPLICATIONS THEREOF

(71) Applicant: SHENZHEN MINJIE ELECTRONIC TECHNOLOGY CO., LTD., Guangdong (CN)

(72) Inventor: Guoliang Hua, Guangdong (CN)

(73) Assignee: SHENZHEN MINJIE ELECTRONIC TECHNOLOGY CO., LTD., Guangdong (CN)

( * ) Notice: Subject to any disclaimer, the term of this patent is extended or adjusted under 35 U.S.C. 154(b) by 105 days.

(21) Appl. No.: 15/505,350

(22) PCT Filed: Jun. 10, 2015

(86) PCT No.: PCT/CN2015/081130
§ 371 (c)(1),
(2) Date: Feb. 21, 2017

(87) PCT Pub. No.: WO2016/026343
PCT Pub. Date: Feb. 25, 2016

(65) Prior Publication Data
US 2017/0268935 A1    Sep. 21, 2017

(30) Foreign Application Priority Data

Aug. 21, 2014   (CN) .................. 2014 2 0476255 U
Nov. 11, 2014   (CN) .................. 2014 1 0631351
Apr. 24, 2015   (CN) .................. 2015 1 0202188

(51) Int. Cl.
  *G01K 1/14*   (2006.01)
  *G01K 7/22*   (2006.01)
  *G01K 1/12*   (2006.01)

(52) U.S. Cl.
CPC ............. *G01K 7/22* (2013.01); *G01K 1/12* (2013.01); *G01K 1/143* (2013.01); *G01K 2207/06* (2013.01)

(58) Field of Classification Search
CPC ........................................ G01K 1/143
See application file for complete search history.

(56) References Cited

U.S. PATENT DOCUMENTS 2,806,122 A * 9/1957 Thunander ......... G05D 23/1913
                                                    219/448.14
3,815,074 A * 6/1974 Nagata .................. H01C 1/1413
                                                    29/612
(Continued)

FOREIGN PATENT DOCUMENTS

CN        1133435 A       10/1996
CN     201514293 U       6/2010
(Continued)

OTHER PUBLICATIONS

"International Application No. PCT/CN2015/081130, International Search Report dated Sep. 28, 2015", w/ English Translation, (Sep. 28, 2015), 8 pgs.

(Continued)

*Primary Examiner* — Clayton E. LaBalle
*Assistant Examiner* — Leon W Rhodes, Jr.
(74) *Attorney, Agent, or Firm* — Schwegman Lundberg & Woessner, P.A.

(57) ABSTRACT

A heat radiation-resistant NTC temperature sensor comprises a measurement rod which is in contact with a plane of an object to be measured. A cavity for accommodating a thermistor is provided in an axial direction of the measurement rod, and the thermistor is in close contact with an upper wall of the cavity of the measurement rod. The thermistor is connected to an external detection device through a wire. The temperature sensor can be used for temperature mea- (Continued)

surement of a pan bottom, and it has an accurate temperature measurement and a high reaction speed, and it can prevent surrounding heat radiation from affecting the temperature measurement.

17 Claims, 5 Drawing Sheets

(56) References Cited

U.S. PATENT DOCUMENTS

| | | | | |
|---|---|---|---|---|
| 4,469,254 | A | * | 9/1984 | Hansen .................. A61J 1/067 222/207 |
| 5,176,451 | A | * | 1/1993 | Sasada .................. F24C 3/126 136/221 |
| 5,394,134 | A | * | 2/1995 | Kurz .................. B60R 16/0239 337/327 |
| 5,428,994 | A | * | 7/1995 | Wenzel .................. G01F 1/684 73/204.22 |
| 8,226,573 | B2 | * | 7/2012 | Sisk .................. G01K 13/002 600/549 |
| 9,593,984 | B2 | * | 3/2017 | Arensmeier ............. G01K 1/08 |
| 10,112,520 | B2 | * | 10/2018 | Becher .................. B60P 3/00 |

FOREIGN PATENT DOCUMENTS

| | | | | |
|---|---|---|---|---|
| CN | 203745095 | U | | 7/2014 |
| CN | 104359583 | A | | 2/2015 |
| CN | 204228287 | U | | 3/2015 |
| FR | 2853413 | A1 | * | 10/2004 ............... G01K 1/14 |
| JP | 08128900 | A | * | 5/1996 |
| JP | 113570 | A | | 1/1999 |
| JP | 2000002594 | A | | 1/2000 |
| JP | 2003334138 | A | | 11/2003 |
| JP | 2006034783 | A | * | 2/2006 |
| JP | 2009092395 | A | * | 4/2009 |
| JP | 2010025420 | A | * | 2/2010 |

OTHER PUBLICATIONS

"International Application No. PCT/CN2015/081130, Written Opinion dated Sep. 28, 2015", (Sep. 28, 2015), 4 pgs.

* cited by examiner

HEAT RADIATION-RESISTANT NTC TEMPERATURE SENSORS AND APPLICATIONS THEREOF

CROSS-REFERENCE TO RELATED APPLICATION(S)

This application is a U.S. National Phase Application of International Application No. PCT/CN2015/081130, filed on Jun. 10, 2015, entitled "ANTI-THERMAL-RADIATION NTC TEMPERATURE SENSOR AND USE THEREOF," which claims priorities to Chinese Application No. 201420476255.0, filed on Aug. 21, 2014, Chinese Application No. 201410631351.2, filed on Nov. 11, 2014, and Chinese Application No. 201510202188.2, filed on Apr. 24, 2015, all of which are incorporated herein by reference in their entireties.

TECHNICAL FIELD

The present disclosure relates to temperature sensors, and more particularly, to heat radiation-resistant NTC temperature sensors and applications thereof.

BACKGROUND

NTC temperature sensors are sensors which perform temperature measurements using a principle that a resistance of a conductor or a semiconductor varies as its temperature varies. In order to improve the accuracy of the measurement of a temperature of a planar object to be measured having a heat source by an NTC temperature sensor, a housing of the NTC temperature sensor is designed to be a plane. Whether a thermistor is in close contact with the housing of the NTC temperature sensor is an important factor which influences a reaction speed of the NTC temperature sensor. In an existing NTC temperature sensor, the thermistor is filled and sealed in an ordinary metal housing by using epoxy resin. Such a filling and sealing method has some shortcomings, for example, it cannot guarantee that the thermistor is in close contact with the inner side of the housing, resulting in a poor thermal conductivity effect, and thus failing to guarantee that the NTC temperature sensor timely reflects a change in the ambient temperature. Further, when the existing NTC temperature sensor measures a temperature of an object, heat radiated by heat sources around the object to be measured will affect the measurement result of the NTC temperature sensor, thereby resulting in inaccurate measurement.

SUMMARY

The present disclosure aims to solve the shortcomings in the prior art, and provides heat radiation-resistant NTC temperature sensors and applications thereof.

A Technical Solution of The Present Disclosure

A heat radiation-resistant NTC temperature sensor comprises a heat radiation-resistant measurement rod, a metal upper cover, a thermal insulation rubber pad, and a thermistor connected to an external control board, wherein the heat radiation-resistant measurement rod comprises a left portion and a right portion which are snap-fitted together; and the heat radiation-resistant measurement rod has the thermal insulation rubber pad adhered thereon, and the metal upper cover has an electrical insulation film or an electrical insulation body attached on an inner side thereof, wherein the electrical insulation film or the electrical insulation body is provided between the metal upper cover and the insulation rubber pad.

Another Technical Solution of The Present Disclosure

A heat radiation-resistant NTC temperature sensor comprises a heat radiation-resistant measurement rod, a metal part, an injection-molded part, and a thermistor connected to an external control board, wherein the metal part is embedded in the center of the injection-molded part, is located in a same plane as the injection-molded part, and is completely wrapped by the injection-molded part, wherein the metal part is made of stainless steel, iron, copper, aluminum, or alloy, and the injection-molded part is made of plastic, ceramic, bakelite, insulation plate, or glass.

Yet Another Technical Solution of The Present Disclosure

A heat radiation-resistant NTC temperature sensor comprises a heat radiation-resistant measurement rod, a metal part, an injection-molded part and a thermistor connected to an external control board, wherein the metal part is embedded in the axial center of the injection-molded part, and is located on the upper surface of the injection-molded part, and the injection-molded part has a screw tooth or a stop ring.

A preferable solution is that the thermistor is a diode-type thermistor, a single-ended-glass-sealed-type thermistor, or a bare die-type thermistor, and the temperature measuring plane of the heat radiation-resistant measurement rod has a diameter less than 40 mm and greater than 3 mm.

A preferable solution is that the heat radiation-resistant measurement rod further comprises a stop ring provided in a circumferential direction.

A preferable solution is that the metal upper cover has a thickness less than 4 mm and a length less than 30 mm; and the thermal insulation rubber pad has a thickness less than 8 mm.

Further Technical Solution of The Present Disclosure

A multi-heat-radiation-resistant NTC temperature sensor (which may be used for a pan bottom) comprises an upper case, a lower case detachably connected to the upper case, and the heat radiation-resistant NTC temperature sensor, wherein the heat radiation-resistant measurement rod is movably stuck in an accommodating cavity formed by the upper case and the lower case; the heat radiation-resistant measurement rod is sleeved by a spring, and has a tail end connected with a metal clamp, and the metal clamp is tightly fit with the heat radiation-resistant NTC temperature sensor, and has a ground plug connected to a ground wire.

A preferable solution is that the upper case is made of insulation material, and has a thickness less than 10 mm and greater than 1 mm; or the upper case is made of metal material and has a thickness less than 3 mm and greater than 0.1 mm.

A preferable solution is that there is a gap between the heat radiation-resistant NTC temperature sensor and the upper case, and the gap is greater than 0.1 mm and less than 15 mm.

A preferable solution is that the heat radiation-resistant NTC temperature sensor for a pan bottom further comprises a circular or square magnet block, the lower case having a holding groove for holding the magnet block in an inner wall thereof; and a reed switch connected to the thermistor.

In conclusion, it can be known from the above technical solutions that the present disclosure has the following beneficial effects: the thermistor is in close contact with the upper wall of the cavity of the heat radiation-resistant measurement rod, and is fixed with epoxy resin or a metal snap fit to guarantee a good thermal conductivity, thereby enabling the thermistor to quickly reflect the temperature of the object to be measured; as the metal part of the heat radiation-resistant measurement rod which is used for temperature measurement is wrapped by the injection-molded part, when the object to be measured is pressed against the heat radiation-resistant measurement rod, the spring is compressed, and thus the heat radiation-resistant measurement rod is in closely contact with a surface of the object to be measured under an elastic force of the spring; and heat radiated from heat sources around the object to be measured is mostly isolated by the heat radiation-resistant ring (which is the injection-molded part surrounding the metal part), which effectively prevents the heat radiated from the heat sources around the object to be measured from affecting the thermistor.

If the object to be measured is pressed against the measurement rod, a signal is required to notify the control board to operate. In this case, the measurement rod with the thermistor connected in series with the reed switch is compressed onto the stopper so that the distance between the magnet and the reed switch is shortened, the reed switch is turned on, and the thermistor becomes to have a normal resistance value from an open circuit, and thereby the control board operates.

The foregoing is merely an overview of the technical solutions of the present disclosure. In order to enable a more clear understanding of the technical solutions of the present disclosure, the present disclosure can be realized in accordance with the content of the description, and in order to make the above and other objects, features and advantages of the present disclosure more apparent, the present disclosure will be described in detail below by way of preferable embodiments with reference to accompanying drawings.

DETAILED DESCRIPTION

It should be illustrated that, embodiments in the present application and features in the embodiments can be combined with each other without conflict. The present disclosure will be further described below with reference to accompanying drawings.

Figure 1:
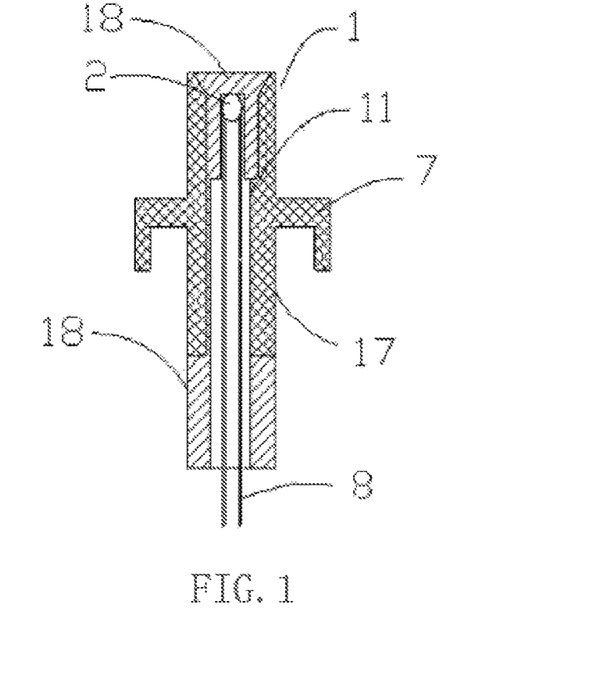
FIG. 1 is a sectional view of a heat radiation-resistant NTC temperature sensor according to a first embodiment of the present discourse.

In a first embodiment, as shown in FIG. 1, a heat radiation-resistant NTC temperature sensor comprises a heat radiation-resistant measurement rod 1 which is in contact with a plane of an object to be measured. A cavity 11 for accommodating a thermistor 2 is provided in an axial direction of the heat radiation-resistant measurement rod 1, and the thermistor 2 is in close contact with an upper wall of the cavity 11 of the heat radiation-resistant measurement rod 1. The thermistor 2 is connected to an external control board through a wire 8.

The heat radiation-resistant measurement rod 1 comprises a metal part 18 and an injection-molded part 17. The metal part 18 is embedded in the center of the injection-molded part 17, and has an upper surface located in the same plane as the upper surface of the injection-molded part 17. The metal part 18 is made of stainless steel, iron, copper, aluminum, or alloy material, and the injection-molded part 17 is made of plastic, ceramic, bakelite, insulation plate, or glass material.

The heat radiation-resistant measurement rod 1 further comprises a stop ring 7 for fixing the position of the sensor. The stop ring 7 is made of plastic, ceramic, bakelite, insulation plate, or glass. The temperature measuring plane of the heat radiation-resistant measurement rod 1 has a diameter less than 40 mm and greater than 3 mm.

As the metal part 18 of the measurement rod 1 which is used for temperature measurement is wrapped by the injection-molded part 17, when an object to be measured is pressed against the heat radiation-resistant measurement rod 1 during the temperature measurement, heat radiated from heat sources around the object to be measured is mostly isolated by the injection-molded part surrounding the metal part 18, which effectively prevents the heat radiated from the heat sources around the object to be measured from affecting temperature measurement by the thermistor.

Figure 2:
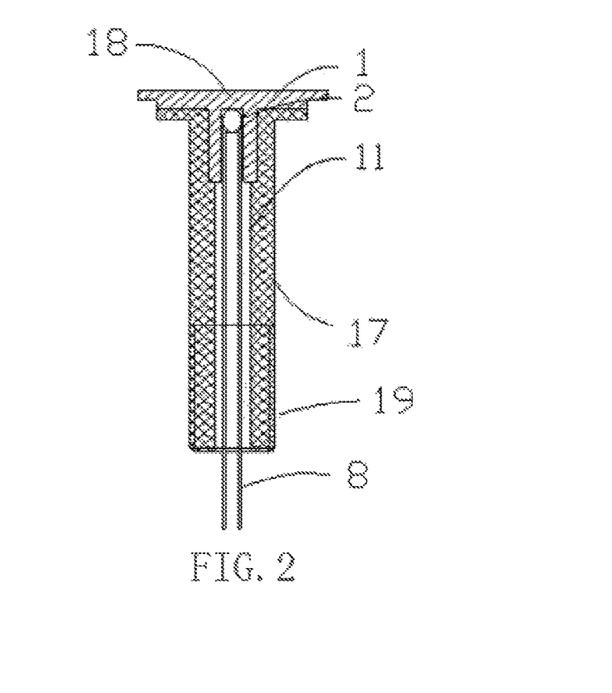
FIG. 2 is a sectional view of a heat radiation-resistant NTC temperature sensor according to a second embodiment of the present discourse.

In a second embodiment, as shown in FIG. 2, a multi-heat-radiation-resistant NTC temperature sensor (which may be used for a pan bottom) comprises a heat radiation-resistant measurement rod 1 which is in contact with a plane of an object to be measured. A cavity 11 for accommodating a thermistor 2 is provided in the axial direction of the heat radiation-resistant measurement rod 1, and the thermistor 2 is in close contact with the upper wall of the cavity 11 of the heat radiation-resistant measurement rod 1. The thermistor 2 is connected to an external control board through a wire 8. An injection-molded part 17 has a screw tooth 19 provided on a tail thereof.

The heat radiation-resistant measurement rod 1 comprises a metal part 18 and the injection-molded part 17. The metal part 18 is embedded in the center of the injection-molded part, The metal part 18 and the injection-molded part 17 are formed into a metal plane with the metal part 18 being located above the injection-molded part 17. The metal part 18 is made of stainless steel, iron, copper, aluminum, or alloy material. The injection-molded part 17 is made of plastic, ceramic, bakelite, insulation plate, or glass material.

The temperature measuring plane of the heat radiation-resistant measurement rod 1 has a diameter less than 40 mm and greater than 3 mm. An upper end layer of the metal part has a thickness greater than 0 mm and less than 4 mm.

During installation, the multi-heat-radiation-resistant NTC temperature sensor (which may be used for a pan bottom) is passed through a hole at the bottom of the object to be measured, and an upper end of the metal part 18 is stuck in the hole at the bottom of the object to be measured and is fastened with a screw nut. As the injection-molded part 17 wraps around other portions of the metal part 18, during the temperature measurement, a temperature measuring plane of the heat radiation-resistant NTC temperature sensor directly senses the temperature of the object to be measured, while the heat radiation-resistant ring isolates the heat sources around the object to be measured from affecting the radiation for temperature measurement.

Figure 3:
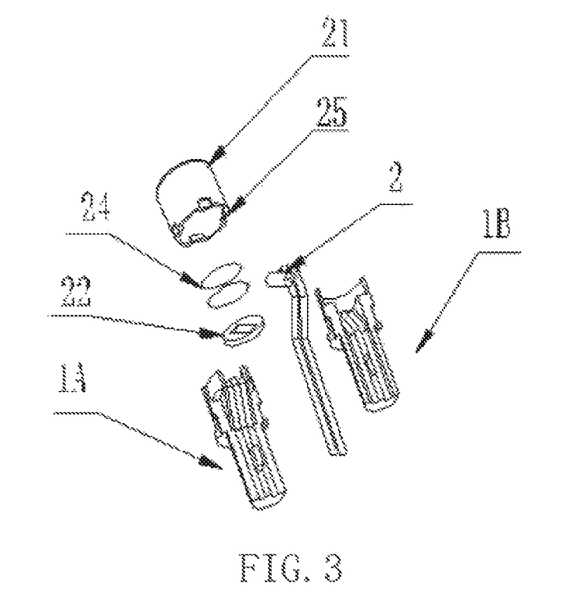
FIG. 3 is an exploded view of parts of a heat radiation-resistant NTC temperature sensor according to a third embodiment of the present discourse.

In a third embodiment, as shown in FIG. 3, a heat radiation-resistant NTC temperature sensor comprises a heat radiation-resistant measurement rod 1, a metal upper cover 21, a thermal insulation rubber pad 22, and a thermistor 2 connected to an external control board. The heat radiation-resistant measurement rod 1 comprises a left portion 1A and a right portion 1B which are snap-fitted together. The heat radiation-resistant measurement rod 1 is provided with a cavity, which has the thermal insulation rubber pad 22 adhered therein. The thermal insulation rubber pad 22 is formed in a shape of the thermistor 2 through molding. The metal upper cover 21 has an electrical insulation film 24 attached on an inner side thereof. Then, the thermistor 2 and the heat radiation-resistant measurement rod 1 are clamped together.

In this embodiment, the thermistor 2 is fixed in the thermal insulation rubber pad 22, and is then fixedly connected to the heat-radiation resistant measurement rod 1 with the metal upper cover 21 by means of a snap fit 25.

The metal upper cover 21 has two electrical insulation film layers 24 provided therein for the purpose of safety. When the thermistor 2 is connected to a high voltage, each electrical insulation film layer 24 can be subjected to a high voltage of 1750V so as to meet the requirements for reinforced insulation. In this way, the metal upper cover 21 can be prevented from being electrically connected to the high voltage at any time. Further, the length of the metal upper cover 21 can be controlled to reduce the reaction speed of the outside to the thermistor 2.

When the metal upper cover 21 holds the heat radiation-resistant measurement rod 1, the thermal insulation rubber pad 22, and the thermistor 2 together, the thermal insulation rubber pad 22 plays a cushioning effect on the thermistor 2 to guarantee that the thermistor 2 will not crushed.

Figure 4:
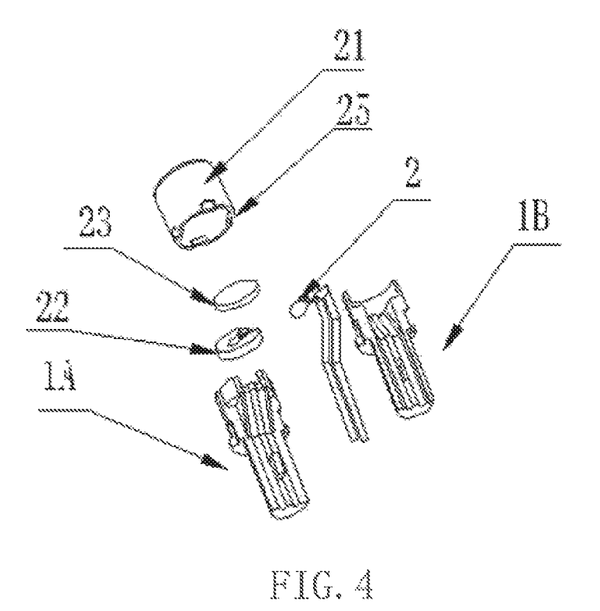
FIG. 4 is an exploded view of parts of a heat radiation-resistant NTC temperature sensor according to a fourth embodiment of the present discourse.

In a fourth embodiment, as shown in FIG. 4, a heat radiation-resistant NTC temperature sensor comprises a heat radiation-resistant measurement rod 1, a metal upper cover 21, a thermal insulation rubber pad 22, and a thermistor 2 connected to an external control board. The heat radiation-resistant measurement rod 1 comprises a left portion 1A and a right portion 1B which are snap-fitted together. The heat radiation-resistant measurement rod 1 is provided with a cavity, which has a thermal insulation rubber pad 22 adhered therein. The thermal insulation rubber pad 22 is provided with a groove for accommodating the thermistor 2. The metal upper cover 21 has an electrical insulation body 23 attached on an inner side thereof. Then, the metal upper cover 21 and the heat radiation-resistant measurement rod 1 which has a built-in thermistor 2 are clamped together.

In this embodiment, the thermistor 2 is fixed in the thermal insulation rubber pad 22, and is then fixedly connected to the heat radiation-resistant measurement rod 1 with the metal upper cover 21 by means of a snap fit 25.

The metal upper cover 21 has a single, electrical insulation body layer of 2 mm provided therein for the purpose of safety. When the thermistor 2 is connected to a high voltage, the single, electrical insulation body layer of 2 mm can be subjected to a high voltage of 3500V. In this way, the metal upper cover 21 can be prevented from being electrically connected to the high voltage at any time. Further, the length of the metal upper cover 21 can be controlled to reduce a reaction speed of the outside to the thermistor 2.

When the metal upper cover 21 holds the heat radiation-resistant measurement rod 1, the insulating rubber pad 22, and the thermistor 2 together, the thermal insulation rubber pad 22 plays a cushioning effect on the thermistor 2 to guarantee that the thermistor 2 is not crushed.

Figure 5:
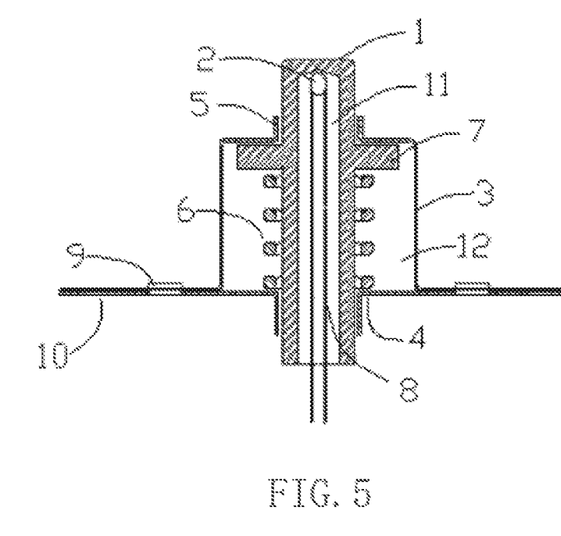
FIG. 5 is a sectional view of a multi-heat-radiation-resistant NTC temperature sensor (which may be used for a pan bottom) according to a fifth embodiment of the present discourse.

In a fifth embodiment, as shown in FIG. 5, a multi-heat-radiation-resistant NTC temperature sensor (which may be used for a pan bottom) comprises a measurement rod 1 which is in contact with a plane of an object to be measured, an upper case 3, a lower case 4, and a compression spring 6. The measurement rod 1 further comprises a stop ring 7 provided in a circumferential direction. A cavity 11 for accommodating a thermistor 2 is provided in the axial direction of the measurement rod 1, and the thermistor 2 is in close contact with the upper wall of the temperature measuring plane of the measurement rod 1. The thermistor 2 is connected to an external measurement apparatus through a wire 8. The measurement rod 1 is stuck in an accommodating cavity 12 formed by the upper case 3 and the lower case 4, and may move freely in the accommodating cavity 12. The measurement rod 1 is sleeved by a spring 6 which is stuck between the stop ring 7 and the lower case 4.

During the temperature measurement, the plane of the measurement rod 1 which is in contact with the object to be measured forms a temperature measuring plane. When the object to be measured is pressed against the plane of the measurement rod 1, under the action of the gravity of the object to be measured and the spring 6, the measurement rod 1 is compressed to be flush with a stopper 5, and is in close contact with the object to be measured. As the stopper 5 of the upper case of insulation material is in the same plane as the metal measurement rod 1, the stopper 5 of the upper case of insulation material prevents the influence of the surrounding heat radiation on the metal measurement rod. The spring ensures that the measurement rod and the plane of the object to be measured are in good contact, so that the temperature of the object to be measured will be accurately measured.

In this example, the multi-heat-radiation-resistant NTC temperature sensor (which may be used for a pan bottom) further comprises the upper case 3 provided on a periphery of the measurement rod 1. The upper case 3 is made of insulation material. There is a gap between the measurement rod 1 and the upper case 3, wherein the gap is greater than 0.1 mm and less than the diameter of the stop ring 7 which is 15 mm. The upper case 3 has a thickness less than 10 mm and greater than 1 mm. The stop ring 7 is a metal ring part and is tightly fitted to the measurement rod 1.

In this example, the measurement rod 1 is a metal cutting part or a casting part, and is made of copper, aluminum, iron, or alloy material.

In this example, the upper case 3 is provided with snap fits 9, the lower case 4 is provided with positioning holes 10, and the upper case 3 and the lower case 4 are detachably connected by means of the snap fits 9 and the positioning holes 10. The temperature measuring plane of the measurement rod 1 has a diameter less than 40 mm and greater than 3 mm.

Figure 6:
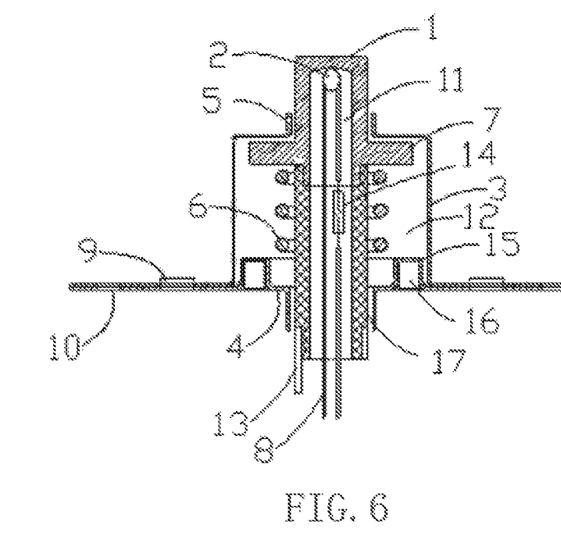
FIG. 6 is a sectional view of a multi-heat-radiation-resistant NTC temperature sensor (which may be used for a pan bottom) according to a sixth embodiment of the present discourse.

In a sixth embodiment, as shown in FIG. 6, this embodiment differs from the fifth embodiment in that this embodiment further comprises a reed switch 14 connected in series with a pin of the thermistor 2, the lower case 4 has a snap groove 15 provided therein, and a magnet block 16 is fixed to the snap groove 15; the measurement rod 1 is injection-molded using metal and plastic by means of a die, and the stop ring 7 is injection-molded using plastic; and the thermistor 2 is in close contact with the upper wall of the cavity 11 of the measurement rod 1.

The temperature measurement principle of the multi-heat-radiation-resistant NTC temperature sensor (which may be used for a pan bottom) is as follows. The thermistor 2 is filled and sealed in the cavity 11 through epoxy resin, and has a pin connected in series with the reed switch 14. Under the action of the gravity of the object to be measured, the measurement rod 1 moves downward, the distance between the reed switch 14 and the magnet block 16 is shortened during the downward movement of the measurement rod 1 and the reed switch 14 becomes a closed circuit from an open circuit. In this way, the measurement of the temperature of the object to be measured is transferred to the external control board through the wire 8. During the temperature measurement, the stopper 5 of the upper case and the measurement rod 1 are in the same plane, and the stopper 5 of the upper case of insulation material prevents the influence of the surrounding heat radiation on the measurement rod 1. The spring 6 ensures that the measurement rod and the plane of the object to be measured are in good contact, so that the temperature of the object to be measured will be accurately measured.

In this example, the stop ring 7 is die-casted with ceramic or is injection-molded with plastic, and the measurement rod 1 is injection-molded with metal and plastic or glass by means of a die. Similarly, the measurement rod 1 may also be formed by tightly fitting a metal cutting part with plastic, bakelite, or an insulation plate.

In this example, there is a gap between the measurement rod 1 and the upper case 3. The gap is greater than 0.1 mm and less than the diameter of the stop ring 7 which is 15 mm. The upper case 3 is made of insulation material, and has a thickness less than 10 mm and greater than 1 mm. The stop ring 7 is a metal ring part and is tightly fitted to the measurement rod 1.

In this example, the upper case 3 is provided with snap fits 9, the lower case 4 is provided with positioning holes 10, and the upper case 3 and the lower case 4 are detachably connected by means of the snap fits 9 and the positioning holes 10. The temperature measuring plane of the measurement rod 1 has a diameter less than 40 mm and greater than 3 mm. The measurement rod 1 has a ground wire 13 provided on the lower end thereof.

Figure 7:
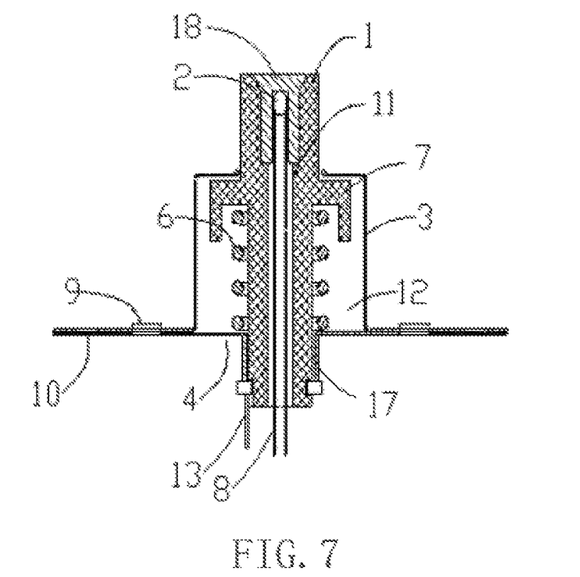
FIG. 7 is a sectional view of a multi-heat-radiation-resistant NTC temperature sensor(which may be used for a pan bottom) according to a seventh embodiment of the present discourse.

In a seventh embodiment, as shown in FIG. 7, this embodiment differs from the fifth embodiment in that the upper case 3 and the lower case 4 are made of metal material.

In this example, as the upper case 3 is made of metal material, the heat radiation-resistant measurement rod 1 comprises a metal part 18 and an injection part 17. The metal part 18 is wrapped by the injection part 17. When the object to be measured is pressed against the heat radiation-resistant measurement rod 1, the spring 6 ensures that the measurement rod 1 and the plane of the object to be measured are in good contact, so that the temperature of the object to be measured will be accurately measured.

The temperature measurement principle of the multi-heat-radiation-resistant NTC temperature sensor (which may be used for a pan bottom) is as follows. As shown in FIG. 7A, when the heat radiation-resistant NTC temperature sensor for a pan bottom is fixed onto a heating plate, the lower case 4 is connected to the housing of the object to be measured, i.e., being connected to the ground wire. A metal clamp 13 of the heat radiation-resistant measurement rod 1 which has a ground plug is fixed to the tail of the heat radiation-resistant measurement rod 1. When no pan is pressed against the heat radiation-resistant measurement rod 1, the metal clamp 13 and the lower case 4 remain in contact and are conductive. As the ground plug of the metal clamp 13 is connected to the ground wire, the input terminal of the thermistor 2 is connected to the metal clamp 13, the metal clamp 13 is connected to the lower case 4 and the lower case 4 is connected to the ground wire. In this way, the thermistor 2 is short-circuited and is connected to the ground. When a pan is pressed against the heat radiation-resistant measurement rod 1, the spring 6 is pressed down so that the heat radiation-resistant measurement rod 1 is pressed down, the metal clamp 13 is separated from the lower case 4, the short circuit is automatically released, and the resistance value of the thermistor 2 can be measured normally.

In this example, the upper case 3 is provided with snap fits 9, the lower case 4 is provided with positioning holes 10, and the upper case 3 and the lower case 4 are detachably connected through the snap fits 9 and the positioning holes 10. The temperature measuring plane of the heat radiation-resistant measurement rod 1 has a diameter less than 40 mm and greater than 3 mm. The metal upper case 3 has a thickness less than 3 mm and greater than 0.1 mm. There is a gap between the heat radiation-resistant measurement rod 1 and the metal upper case 3. The gap is greater than 0.1 mm and less than the diameter of the stop ring 7 which is 15 mm.

In this example, the heat radiation-resistant measurement rod 1 comprises a metal part 18 and an injection-molded part 17. The heat radiation-resistant measurement rod 1 is formed by tightly fitting the metal part 18 and the injection-molded part 17 by means of a die. The stop ring 7 is die-casted with ceramic. Similarly, the heat radiation-resistant measurement rod 1 may also be formed by tightly fitting a metal cutting part with bakelite or an insulation plate, or is injection-molded with metal and plastic, ceramic, or glass by means of a die.

Figure 8:
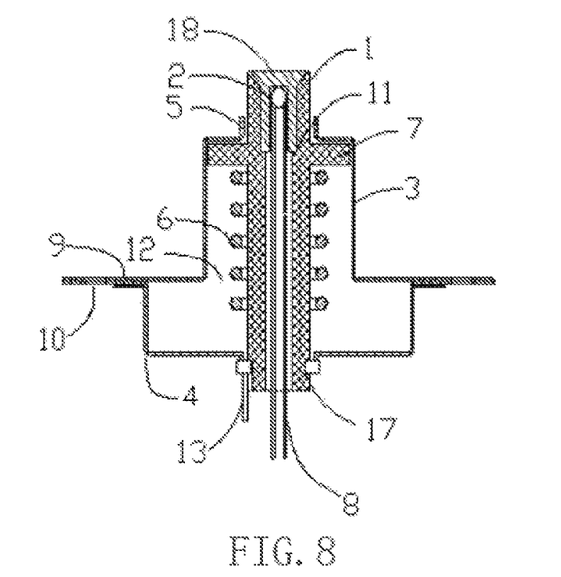
FIG. 8 is a sectional view of a multi-heat-radiation-resistant NTC temperature sensor(which may be used for a pan bottom) according to an eighth embodiment of the present discourse.

In an eighth embodiment, as shown in FIG. 8, this embodiment differs from the seventh embodiment in that in this embodiment, the upper case 3 is made of insulation material and the lower case is made of metal material.

The upper case 3 is made of insulation material, and the metal part 18 of the measurement rod 1 which is used for temperature measurement is wrapped by the injection part 17. When the object to be measured is pressed against the heat radiation-resistant measurement rod 1, as the stopper 5 and the temperature measuring plane of the heat radiation-resistant measurement rod 1 are located in the same plane, the upper case 3 and the stopper 5 prevent the influence of the surrounding heat radiation on the heat radiation-resistant measurement rod 1. Further, the heat radiation-resistant measurement rod 1 per se provides a heat radiation-resistant function. In this way, the surrounding heat radiation will be isolated twice. The spring 6 ensures that the heat radiation-resistant measurement rod 1 and the plane of the object to be measured are in good contact, so that the temperature of the object to be measured is extremely accurately measured.

The temperature measurement principle of the multi-heat-radiation-resistant NTC temperature sensor (which may be used for a pan bottom) is as follows. As shown in FIGS. 8 and 8A, when the heat radiation-resistant NTC temperature sensor for a pan bottom is fixed onto a heating plate, the lower case 4 is connected to the housing of the object to be measured, i.e., being connected to the ground wire. A metal clamp 13 of the heat radiation-resistant measurement rod 1 which has a ground plug is fixed to the tail of the heat radiation-resistant measurement rod 1. When no pan is pressed against the heat radiation-resistant measurement rod 1, the metal clamp 13 and the lower case 4 remain in contact and are conductive. In this way, an input terminal of the thermistor 2 is connected to the metal clamp 13, the metal clamp 13 is connected to the lower case 4 and the lower case 4 is connected to the ground wire, so that the thermistor 2 is short-circuited and is connected to the ground. When there is a pan pressed against the heat radiation-resistant measurement rod 1, the spring 6 is pressed down so that the heat radiation-resistant measurement rod 1 is pressed down, the metal clamp 13 is separated from the lower case 4, the short circuit is automatically released, and the resistance value of the thermistor 2 can be measured normally.

In this example, the heat radiation-resistant measurement rod 1 is die-casted with metal and ceramic, and the stop ring 7 is die-casted with ceramic or injection-molded with plastic. Similarly, the heat radiation-resistant measurement rod 1 may be formed by tightly fitting a metal cutting part with bakelite or an insulating plate, or is injection-molded with metal and plastic or glass by means of a die.

In this example, the upper case 3 is provided with snap fits 9, the lower case 4 is provided with positioning holes 10, and the upper case 3 and the lower case 4 are detachably connected by means of the snap fits 9 and the positioning holes 10. The temperature measuring plane of the heat radiation-resistant measurement rod 1 has a diameter less than 40 mm and greater than 3 mm. The metal upper case 3 is made of insulation material, and has a thickness less than 10 mm and greater than 1 mm. There is a gap between the heat radiation-resistant measurement rod 1 and the metal upper case 3. The gap is greater than 0.1 mm and less than a diameter of the stop ring 7 which is 15 mm.

Figure 9:
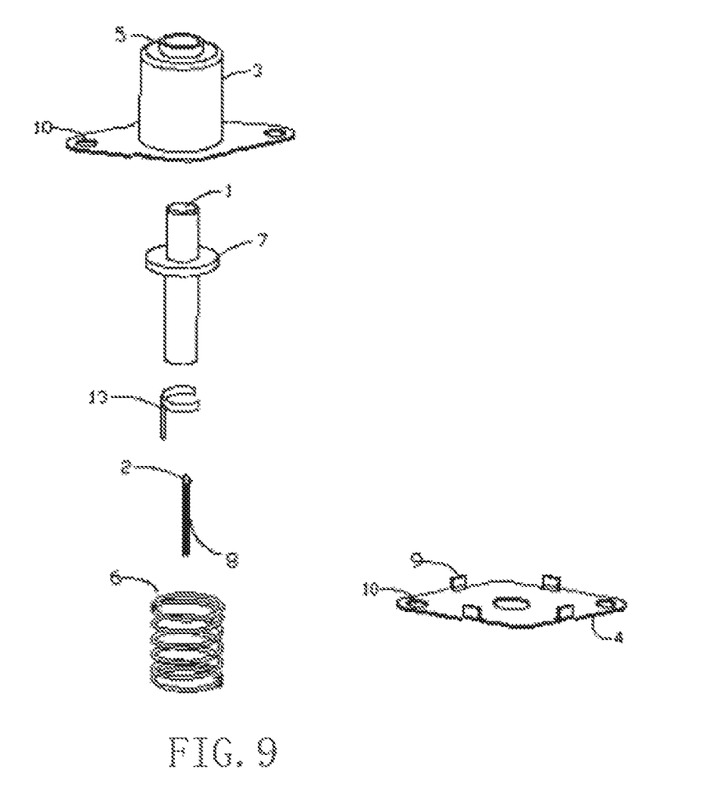
FIG. 9 is an exploded view of a multi-heat-radiation-resistant NTC temperature sensor (which may be used for a pan bottom) according to the present discourse.

FIG. 9 is an exploded view of a multi-heat-radiation-resistant NTC temperature sensor (which may be used for a pan bottom), which comprises a heat radiation-resistant measurement rod 1, a thermistor 2, an upper case 3, a lower case 4, a stopper 5, a spring 6, a wire 8, snap fits 9, and positioning holes 10.

The foregoing is specific embodiments of the present disclosure, and it should be pointed out that a number of modifications and improvements can be made by those skilled in the art without departing from the principle of the present disclosure. These modifications and improvements are also construed as falling within the protection scope of the present disclosure.

The invention claimed is:

1. A heat radiation resistant NTC temperature sensor comprising a heat radiation resistant measurement rod and a thermistor connected to an external control board,
wherein the heat radiation resistant measurement rod comprises a metal part and an injection-molded part,
wherein the metal part is embedded in the center of the injection-molded part,
wherein the upper end face of the metal part and the upper end face of the injection-molded part are located in a same temperature measuring plane,
wherein other regions of the metal part than the temperature sensing plane is completely wrapped by the injection-molded part,
wherein the thermistor is in close contact with the inner wall of the metal part, and a wire connected to the thermistor is drawn through the lower end face of the injection-molded part which wraps the metal part,
wherein the temperature measuring plane of the heat radiation resistant measurement rod has a diameter less than 40 mm and greater than 3 mm,
wherein the metal part is made of stainless steel, iron, copper, aluminum, or alloy, and the injection-molded part is made of plastic, ceramic, bakelite, insulation plate, or glass.

2. The heat radiation resistant NTC temperature sensor according to claim 1, wherein the thermistor is a diode-type thermistor, a single-ended-glass-sealed-type thermistor, or a bare die-type thermistor.

3. The heat radiation resistant NTC temperature sensor according to claim 1, wherein the heat radiation resistant measurement rod further comprises a stop ring provided in a circumferential direction which restricts the movement range of a spring.

4. A heat radiation resistant NTC temperature sensor for a pan bottom, the sensor comprising an upper case, a lower case detachably connected to the upper case, and the heat radiation resistant NTC temperature sensor of claim 1,
wherein the heat radiation resistant measurement rod is movably stuck in an accommodating cavity formed by the upper case and the lower case,
wherein the heat radiation resistant measurement rod is sleeved by a spring, and has a tail end connected with a metal clamp,
wherein the metal clamp is tightly fit with the heat radiation resistant NTC temperature sensor, and has a ground plug connected to a ground wire.

5. The heat radiation resistant NTC temperature sensor according to claim 4,
wherein the upper case is made of insulation material, and has a thickness less than 10 mm and greater than 1 mm; or
wherein the upper case is made of metal material and has a thickness less than 3 mm and greater than 0.1 mm.

6. The heat radiation resistant NTC temperature sensor according to claim 4, wherein there is a gap between the heat radiation resistant NTC temperature sensor and the upper case, and the gap is greater than 0.1 mm and less than 15 mm.

7. The heat radiation resistant NTC temperature sensor according to claim 4, further comprising:
a circular or square magnet block, the lower case having a holding groove for holding the magnet block in an inner wall thereof, and
a reed switch connected to the thermistor.

8. A heat radiation resistant NTC temperature sensor comprising a heat radiation resistant measurement rod and a thermistor connected to an external control board,
wherein the heat radiation resistant measurement rod comprises a metal part and an injection-molded part,
wherein the metal part is embedded in the axis of the injection-molded part,
wherein the thermistor is in close contact with the inner wall of the metal part, and a wire connected to the thermistor is drawn through the lower end face of the injection-molded part which wraps the metal part,
wherein the metal part is located on the upper surface of the injection-molded part, wherein the temperature measuring plane of the heat radiation resistant measurement rod has a diameter less than 40 mm and greater than 3 mm, and an upper end layer of the metal part has a thickness greater than 0 mm and less than 4 mm, wherein the injection-molded part has a screw tooth or a stop ring.

9. The heat radiation resistant NTC temperature sensor according to claim 8, wherein the thermistor is a diode-type thermistor, a single-ended-glass-sealed-type thermistor, or a bare die-type thermistor.

10. The heat radiation resistant NTC temperature sensor according to claim 8, wherein the heat radiation resistant measurement rod further comprises a stop ring provided in a circumferential direction which restricts the movement range of a spring.

11. A heat radiation resistant NTC temperature sensor for a pan bottom, the sensor comprising an upper case, a lower case detachably connected to the upper case, and the heat radiation resistant NTC temperature sensor of claim 8, wherein the heat radiation resistant measurement rod is movably stuck in an accommodating cavity formed by the upper case and the lower case, wherein the heat radiation resistant measurement rod is sleeved by a spring, and has a tail end connected with a metal clamp, wherein the metal clamp is tightly fit with the heat radiation resistant NTC temperature sensor, and has a ground plug connected to a ground wire.

12. The heat radiation resistant NTC temperature sensor according to claim 11, wherein the upper case is made of insulation material, and has a thickness less than 10 mm and greater than 1 mm; or wherein the upper case is made of metal material and has a thickness less than 3 mm and greater than 0.1 mm.

13. The heat radiation resistant NTC temperature sensor according to claim 11, wherein there is a gap between the heat radiation resistant NTC temperature sensor and the upper case, and the gap is greater than 0.1 mm and less than 15 mm.

14. The heat radiation resistant NTC temperature sensor according to claim 11, further comprising:

a circular or square magnet block, the lower case having a holding groove for holding the magnet block in an inner wall thereof, and a reed switch connected to the thermistor.

15. A heat radiation resistant NTC temperature sensor comprising a heat radiation resistant measurement rod, a metal upper cover, an insulation rubber pad, and a thermistor connected to an external control board, wherein the heat radiation resistant measurement rod comprises a left portion and a right portion which are snap-fitted together, wherein the heat radiation resistant measurement rod has the insulation rubber pad adhered thereon, wherein the metal upper cover has an insulation film attached on an inner side thereof, and the insulation film is provided between the metal upper cover and the insulation rubber pad, wherein the thermistor is located between the insulation rubber pad and the insulation film, wherein the metal upper cover has a thickness less than 4 mm and a length less than 30 mm, and the insulation rubber pad has a thickness less than 8 mm.

16. The heat radiation resistant NTC temperature sensor according to claim 15, wherein the thermistor is a diode-type thermistor, a single-ended-glass-sealed-type thermistor, or a bare die-type thermistor.

17. The heat radiation resistant NTC temperature sensor according to claim 15, wherein the heat radiation resistant measurement rod further comprises a stop ring provided in a circumferential direction which restricts the movement range of a spring.

* * * * *